United States Patent [19]

Heasman

[11] 4,041,031
[45] Aug. 9, 1977

[54] METHOD OF MAKING FIBER REINFORCED PROTECTIVE HEADGEAR

[75] Inventor: Peter John Robert Heasman, Hale, England

[73] Assignee: Imperial Chemical Industries Limited, London, England

[21] Appl. No.: 530,486

[22] Filed: Dec. 6, 1974

[30] Foreign Application Priority Data

Dec. 20, 1973 United Kingdom ............ 59055/73
Dec. 20, 1973 United Kingdom ............ 59057/73

[51] Int. Cl.² .......................... B29D 3/02; B29F 1/00
[52] U.S. Cl. .................... 264/250; 264/259; 264/266; 264/274; 264/279; 264/328
[58] Field of Search ............ 264/250, 273, 274, 246, 264/247, 259, 266, 279, 328; 2/3 R

[56] References Cited

U.S. PATENT DOCUMENTS

| 2,312,227 | 2/1943 | Yant | 2/3 R |
| 2,337,550 | 12/1943 | Crosby | 264/250 |
| 2,698,434 | 1/1955 | Davia | 2/3 R |
| 2,931,042 | 4/1960 | Austin | 2/3 R |
| 3,164,864 | 1/1965 | Kobayashi | 264/250 |
| 3,302,242 | 2/1967 | Morin | 264/250 |
| 3,426,121 | 2/1969 | Faulkner | 264/250 |
| 3,514,366 | 5/1970 | Allport | 264/274 |

*Primary Examiner*—Willard E. Hoag
*Attorney, Agent, or Firm*—Cushman, Darby & Cushman

[57] ABSTRACT

Method of making protective headgear including forming a peak or visor portion and thereafer injection molding a fiber-filled resin onto the peak portion to form a shell portion, the shell portion resin containing 10-40% by weight of fibers at least 5 mm in length.

10 Claims, 11 Drawing Figures

METHOD OF MAKING FIBER REINFORCED PROTECTIVE HEADGEAR

This invention relates to protective headgear and in particular to hats or helmets having an impact resistant plastic shell. Exemplary of such headgear are safety helmets of the miner's, pot-holer's or building construction worker's types, motor cycle crash helmets, and riding hats of the type worn by horsemen and women. The invention will be described in relation to the latter type of hat but it will be appreciated that it can also be applied to the other types of protective headgear.

Often the impact resistant shells are covered with e.g. fabric, to give an attractive appearance.

It has been proposed in British Pat. No. 570,567 and French Pat. No. 1,214,865 to make safety headgear from plastics materials having a fibre reinforcement embedded therein.

For many types of such headgear it is desired that it should have a peak or brim extending forward of the wearers head.

Heretofore such peaks have been constructed from a rigid material and have often been integrally formed with the main, protective, portion hereinafter termed the crown portion of the shell of the hat.

However, there is an increasing bias against such rigid peaks from the safety viewpoint and indeed there is a desire for a shell having a flexible peak.

It has been proposed in French Pat. No. 1,214,865 to make the sides of the hat more flexible than the crown, e.g. by using a different reinforcing material, while in British Pat. No. 570,567 it is suggested that the peak could be of unreinforced plastic.

The techniques described in aforesaid French and British Patents involve impregnation or "lay-up" techniques commonly used for making fibre reinforced polyester resin articles.

It would be desirable in the interests of economy and ease of mass production to make hat shells with a flexible peak by means of injection moulding. However simple overmoulding of the flexible peak material on to a crown made from the fibre reinforced plastic does not produce a satisfactory strong bond at the junction of the flexible peak and the crown portion of the shell. Surprisingly we have found that by moulding the crown on to peak, a strong bond can be obtained.

According to the present invention we provide a method of making a shell for an article of protective headgear having a peak of a flexible thermoplastic organic polymeric material and a crown portion moulded thereto, said crown portion comprising a thermoplastic organic polymeric material reinforced with 10 to 40% by weight of a fibrous material wherein the fibres have an average length of at least 5 mm, comprising injecting, in a molten state, the crown material comprising the thermoplastic organic polymeric material containing the fibrous material into a mould cavity having a part defining the crown portion and a part defining the peak portion of the shell to contact and fuse with an earlier formed peak, situated in the part of the mould cavity defining the peak portion of the shell and formed from a peak material comprising the flexible thermoplastic organic polymeric material, said peak material having a melting point below the temperature at which the crown material is injected into the mould cavity, and cooling the resultant moulding to solidify the plastics materials.

The fibre reinforced crown portion donates the impact resistance and the presence of long fibres i.e. at least 5 mm, preferably at least 8 mm long, as opposed to short fibres, as are generally found in articles of fibre reinforced thermoplastic materials, renders the crown portion resistant to crack propagation.

The fibrous material is preferably glass or asbestos with the former being particularly preferred. The thermoplastic material from which the crown is made should contain 10 to 40%d by weight of the fibrous material, preferably 20 to 30% by weight.

The thermoplastic polymeric material from which the crown portion is made is preferably polypropylene, by which term we include copolymers of propylene with minor amounts (less than 20% by weight) of comonomers such as ethylene; high density polyethylene; styrene/acrylonitrile copolymer resin (SAN); acrylonitrile/butadiene/styrene resin (ABS); or polycarbonate. Polypropylene is preferred.

The crown portion formed from such a fibre containing composition has good impact resistance and rigidity. However, the exposed edges i.e. round the periphery thereof are liable to be hard. In use, and particularly in an accident, these hard edges could cause the wearer some discomfort. Therefore, in a preferred form of the invention, a strip of thermoplastic organic polymeric material containing no fibrous filler is moulded to enclose the exposed edges. This material may be the same as that used for the peak, or it may be different. In the former case the strip preferably forms a continuation of the peak.

The strip of unfilled material can generally accept the needle of a commercial sewing machine so that, if desired, any coverng fabric can simply be stitched to the strip.

The peak and/or the aforesaid strip are conveniently formed from a thermoplastic organic polymeric material having the requisite degree of flexibility selected from polypropylene, high density polyethylene, low density polyethylene, ethylene-vinyl acetate copolymers or polyvinyl chloride. The material used for the peak portion may be the same as or different to the polymeric material as used in the composition from which the crown portion is made. Where it is the same material, the rigidity of the crown portion relative to the peak is given by the fibre reinforcement in the crown portion. Whatever combination of materials are used, the peak material should melt at temperatures below that at which the crown material is injected.

The precise materials used as the peak material will depend on the desired degree of flexibility. However, polypropylene, low density polyethylene or ethylene/vinyl acetate copolymers are preferred, especially where the crown portion is made from fibre reinforced polypropylene, as these materials form a strong bond to the polypropylene of the crown portion.

The shells are made by an injection overmoulding technique.

The peak is positioned in the part of the mould cavity defining the peak portion of the shell and the edging strip, if used, is positioned round the periphery of the part of the mould cavity defining the crown portion of the shell, and the crown material is moulded on to the peak. The mould is preferably cooled to prevent undue softening and distortion of the peak. This technique gives particularly strong bonds between the crown and peak since the fibrous material appears to penetrate to some extent into the peak material. To provide an even stronger bond the peak is preferably provided with a plurality of projections in the region where it is contacted by the crown material. The projections preferably partially enclose re-entrant spaces into which the crown material flows during the moulding of the crown portion thus forming a mechanical key.

The earlier formed peak itself may be preformed injection moulding which is placed in that part of the mould defining the peak portion of the shell prior to injection of the crown material. If used, the edging strip may also be injection moulded, either integrally with the peak, or as a separate moulding.

Another method of forming the shell is by injection of the peak and crown materials, and optionally the edging strip material, through separate sprue channels into a single mould. A multiple barrel injection moulding machine is there required. The materials may be injected sequentially or simultaneously, or with some overlap of injection e.g. injection of crown material is commenced before completion of peak material. However, the injection of the peak material is completed before injection of the crown material is complete so that the crown material flows into the earlier formed peak material rather than the reverse.

In such a process, to obtain an additional mechanical key the peak material may be caused to flow through the spaces between projections of an insert in the mould. The insert is then retracted after injection of the peak material so that the crown material can flow into the spaces vacated by the projections of the insert.

Whichever moulding method is utilised, care should be taken to avoid reduction in the length of the fibrous material in the crown material during moulding.

We have found that this may be achieved by minimising the back pressure exerted on the composition during the plasticising stage. Naturally the fibre length of the starting material should be sufficient. A compounded material, such as glass coupled polypropylene as produced by the process of our U.K. Pat. No. 1,334,702 may be used, or alternatively fibres and polymers may be fed separately to an injection moulding machine and mixed therein. Thus glass rovings may be fed to the feed hopper of the injection moulding machine or may be introduced through the vent of a vented screw injection moulding machine.

The injection rate should also be controlled. Too fast a rate gives too much breakage of the fibrous material while too slow a rate is liable to give undue strain in the final moulding. For making riding hat shells from glass fibre reinforced polypropylene, injection times within the range 1.5 to 2 seconds are particularly suitable.

Two embodiments of the invention will now be described with reference to the accompanying drawings wherein FIG. 1 is a perspective view of a riding hat shell made in accordance with the invention.

Figure 1:
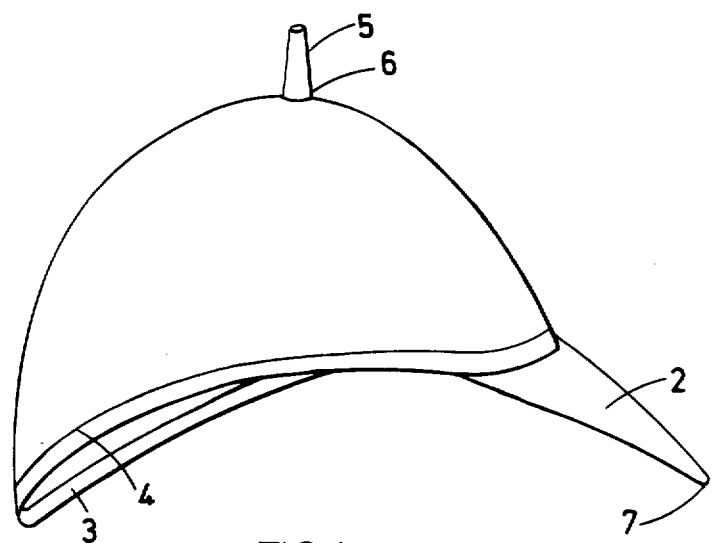

The shell comprises a crown portion 1 formed from glass fibre reinforced polypropylene, and a peak portion 2 formed from low density polyethylene. The low density polyethylene also extends right round the base of the hat to form an edging strip 3 so that the hard lower edge 4 of the crown portion is not exposed.

The shell is formed by first injecting moulding the peak and edging strip as a single moulding and then placing this moulding in position in a mould into which the glass reinforced polypropylene is injected through a sprue 5 which is subsequently cut off at the position indicated by reference 6.

The glass reinforced polypropylene, in the form of cylindrical pellets of length about 10 mm and diameter 3 mm made by the process of our U.K. Patent No. 1,334,702 and containing about 25% by weight of glass fibres having a length substantially equal to the length of the pellets, was injected from a reciprocating screw injection moulding machine at a temperature of 265° C using no applied back pressure in the plasticising stage. The injection time was about 1.8 seconds. The mould used was of the vertical flash type and, after injection of the glass reinforced polypropylene the mould clamping force caused the mould cavity to reduce slightly in size to accommodate shrinkage on cooling. This also allowed strain induced during the injection step to relax. The length of the glass fibres in the moulded crown portion was essentially unchanged by the moulding process.

Another way of making the moulding is by multipoint injection wherein the polyethylene is injected from a sprue at the front of the peak 2 (indicated by reference 7 in FIG. 1) and the glass fibre reinforced polypropylene injected through sprue 5. The timing of the injections and the mould design should be arranged so that the interface between the polyethylene and the glass fibre reinforced polypropylene occurs at the desired position.

Figure 2:
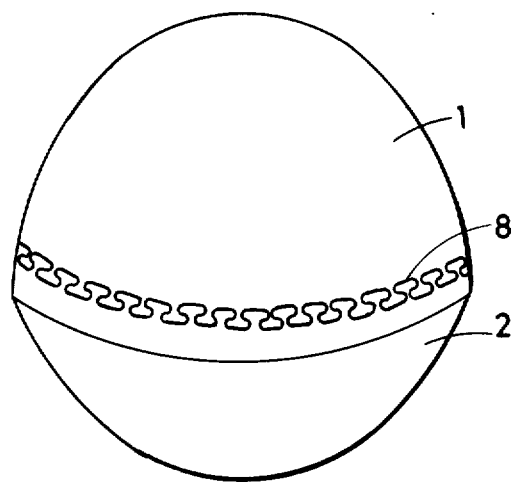
FIG. 2 is a front elevation of another riding hat made in accordance with the invention.
Figure 3:
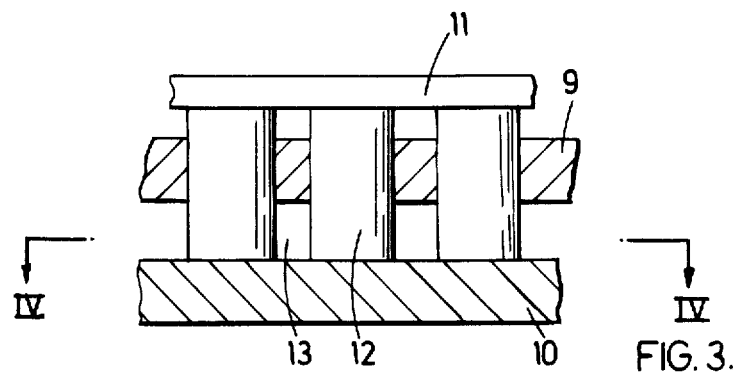
FIG. 3 is a cross section through part of a mould used to make a mechanical bond between the peak and crown.
Figure 4:
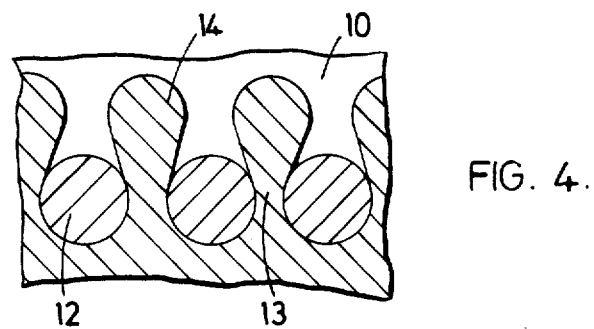
FIG. 4 is a section along the line IV—IV of FIG. 3 after injection of the peak material.

In FIG. 2 a hat shell is shown having a mechanical bond between the peak portion 2 and the crown portion 1. This is produced by forming reentrant notches 8 in the peak portion at the position of the interface so that the glass fibre reinforced polypropylene flows into these notches during moulding and thus locks the two portions of the shell together.

The notches 8 may be moulded in place if the peak portion 2 is made as a separate moulding or, if a multipoint injection technique is adopted, may be produced by the provision in the mould of a suitable insert having a plurality of spaced projections projecting into the mould cavity during injection of the peak material; the insert being retracted prior to the glass fibre reinforced polypropylene melt front reaching the notches. This latter technique is described in more detail in relation to FIGS. 3 to 11.

Referring to FIGS. 3 to 6, the mould consists of mould members 9, 10 defining the desired cavity. At the position of the desired notches 8, an insert 11 comprising a plurality of projections 12 in the form of cylindrical rods is positioned to partially obstruct the mould. On injection of the peak material, from a first sprue channel (not shown), the peak material flows through the spaces 13 between adjacent projections 12, and by virtue of the normal viscoelastic flow characteristics of plastic melts, swells after it has passed through these spaces (see FIG. 4) to form protrusions 14 spaced less than the diameter of the projections 12. Injections of the peak material is stopped before the molten peak material passing through the spaces welds to itself on the side of the projections 12 remote from the sprue channel.

This may be achieved by providing a sensor, which may respond to the pressure of the melt or to the temperature thereof adjacent to, or located in, the insert, and utilising a signal from the sensor to stop injection of the peak material.

When the injected peak material has solidified sufficiently to retain its shape, the insert 11 is retracted until the ends of projections 12 lie flush with the surface of mould member 9, and the crown material is injected through a second sprue channel (not shown) into the crown part of the mould cavity on the other side of projections 12 to the first sprue channel. The signal from the sensor may be used, in conjunction with delay circuits if necessary, to trigger injection of the crown material and/or retraction of the insert. Alternatively injection of the crown material may commence before retraction of the insert and, in some cases, before stopping injection of the peak material. However the insert is retracted before the melt front of the crown material reaches the insert.

Figure 5:
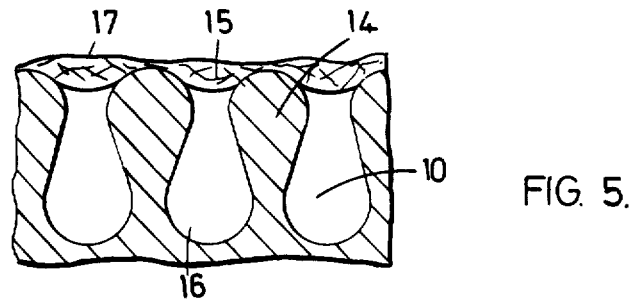
FIG. 5 is a view similar to that of FIG. 4 after retraction of the insert and showing the crown material starting to enter the spaces vacated by the projections of the insert.
Figure 6:
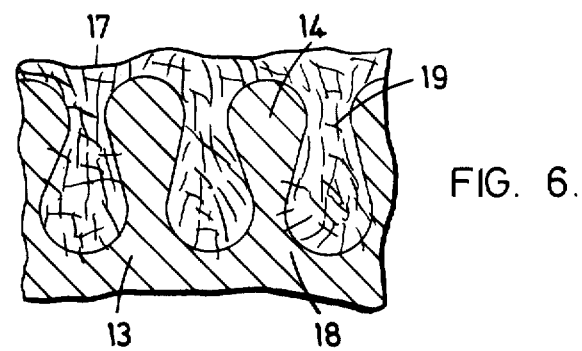
FIG. 6 is a view similar to FIG. 5 but showing the configuration after completion of injection of the crown material.

In FIG. 5 the melt front of the crown material 15 is shown to have just contacted the protrusions 14. The crown material continues to flow into the spaces 16 (which constitute notches 8 in FIG. 2) vacated by the projections 12 and so fill them (FIG. 6). After solidification the two materials are thus locked or keyed together by the protrusions 14 and the material 15 filling the spaces 16 vacated by the projections 12.

The long fibres 17 of the crown material 15 increase the keying by projecting into the peak material as shown at 18 in FIG. 6 and also by extending both inside and outside the spaces 16 as indicated at 19 in FIG. 6. Thus the fibres 17 tend to become aligned as they pass through the narrow neck between adjacent protrusions 15 of the peak material.

Figure 7:
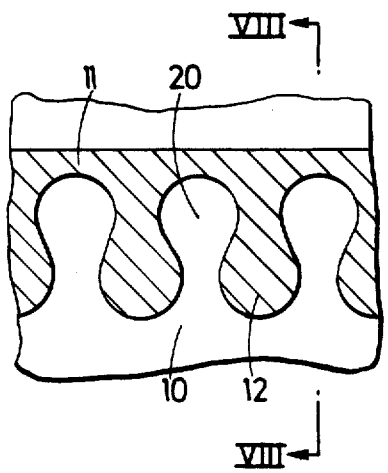
FIG. 7 is a view similar to FIG. 2 showing an alternative insert configuration, before injection of the peak material.
Figure 8:
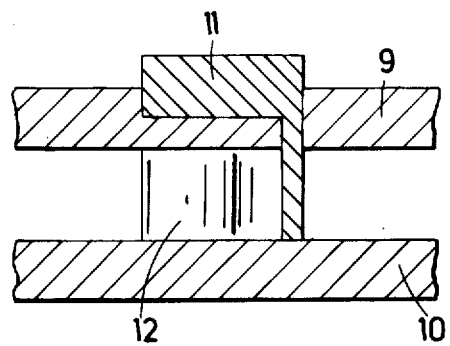
FIG. 8 is a section along the line VIII—VIII of FIG. 7.

An alternative arrangement is shown in FIGS. 7 and 8. Here the insert 11 forms, in conjunction with mould members 9 and 10, a closed mould, at least in the region where the mechanical bond is desired, into which the peak material is injected. The insert takes the form of a plate slidably mounted in mould member 9 having a plurality of re-entrant notches 20 formed by projections 12.

The peak material is injected until these notches 20 are filled, thus avoiding the necessity, as in the embodiment of FIGS. 3 to 6, of judging when to stop injection so that the peak material passes through the spaces between the projections but does not weld together on the reverse side.

After forming the peak moulding from the peak material, the insert 11 is retracted and the crown material caused to flow into the spaces vacated by projections 12 as previously described.

Figure 9:
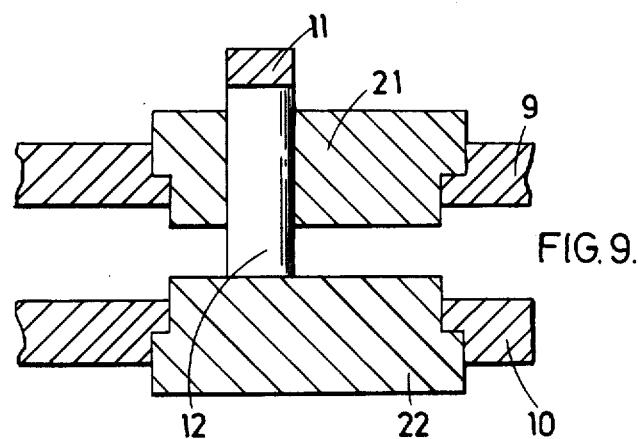
FIG. 9 is a view similar to that of FIG. 8 but showing an alternative insert arrangement.
Figure 10:
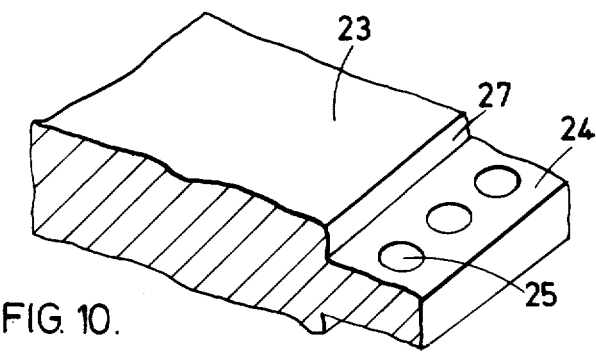
FIG. 10 is a perspective view of part of a moulding of the peak material formed using the mould of FIG. 9.
Figure 11:
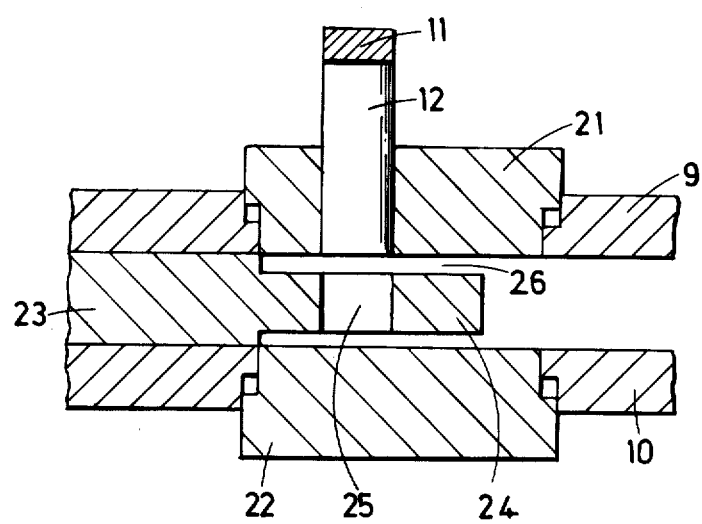
FIG. 11 is a view similar to FIG. 9 but after retraction of the insert.

In another embodiment as illustrated in FIGS. 9, 10 and 11, each of mould members 9 and 10 is provided with a movable plate 21, 22 respectively. Mould member 9 is provided with the insert 11 as previously described. The insert may have a plurality of rods, one of which is shown in FIGS. 9 and 11 as in the embodiment of FIGS. 3 to 6, or it may be a plate as in the embodiment of FIGS. 7 and 8.

The movable plates 21, 22 extend beyond insert 11 to the crown material injection side of insert 11 in one direction and at least to the front edge of the projections 12 of insert 11 on the peak material injection side of insert 11. The plates 21, 22 protrude into the mould cavity during injection of the peak material thus restricting the cavity size at the region of the desired joint.

As before, the peak material is injected so that it passes through the spaces between projections 12 but in this embodiment the projections 14 formed from the peak material passing through the spaces may be allowed to weld together. Thus the moulding 23 of the peak material may have a rebated edge 24 having holes 25 therein — see FIG. 10.

After solidification of the peak material to such an extent that it is form stable, the insert 11 and plates 21 and 22 are retracted flush with the mould members 9 and 10 as shown in FIG. 11 and the crown material injected. This thus flows into the spaces 26 vacated by plates 21 and 22 and into the holes 25 in the peak moulding 23 formed by retraction of the projections 12.

Thus the crown material is locked to the peak material but gives a clear line of demarkation between the two materials i.e. along the line 27 forming the edge of rebate 24.

I claim:

1. A method of making a shell for an article of protective headgear having a peak of a flexible thermoplastic organic polymeric material and a crown portion moulded thereto, said crown portion comprising a thermoplastic organic polymeric material reinforced with 10 to 40% by weight of a fibrous material wherein the fibres have an average length of at least 5 mm, comprising injecting in a molten state the crown material comprising the thermoplastic organic polymeric material containing the fibrous material into a mould cavity having a part defining the crown portion and a part defining the peak portion of the shell to contact and fuse with an earlier formed peak, situated in the part of the mould cavity defining the peak portion of the shell and formed from a peak material comprising the flexible thermoplastic organic polymeric material, said peak material having a melting point below the temperature at which the crown material is injected into the mould cavity, and cooling the resultant moulding to solidify the plastics materials, the polymers of said crown and peak portions being bondable to each other.

2. A method according to claim 1 in which the crown material is injected into the mould cavity to contact and fuse with a strip of thermoplastic organic polymeric material free from fibrous material positioned in the mould cavity around the periphery of the part of the mould cavity defining the crown portion of the shell other than that part of the mould cavity defining the peak portion of the shell.

3. A method as claimed in claim 2 wherein the strip is integral with the peak and the peak material is free from fibrous filler material.

4. A method as claimed in claim 1 wherein the peak and crown portions are formed in the same mould by injection of the peak and crown materials through separate sprue channels, injection of the peak material being completed before completion of injection of the crown material.

5. A method as claimed in claim 1 in which the peak is provided with a plurality of projections in the region where it is contacted by the crown material.

6. A method as claimed in claim 5 in which the projections partially enclose re-entrant spaces into which the crown material flows during moulding of the crown portion.

7. A method as claimed in claim 5 wherein the peak and crown portions are formed in the same mould by injection of the peak and crown materials through separate sprue channels, injection of the peak material being completed before completion of injection of the crown material and a retractable insert having a plurality of projections extending into the mould cavity is provided in the mould cavity, and the peak material is injected such that it flows through the spaces between the projections of the insert and the insert is then retracted after injection of the peak material so that the crown material can flow into the spaces vacated by the projections of the insert.

8. A method as claimed in claim 1 in which the fibrous material of the crown material is glass fibre.

9. A method as claimed in claim 1 in which the thermoplastic organic polymeric material of the crown material is polypropylene.

10. A method as claimed claim 1 in which the peak material is selected from polypropylene, low density polyethylene, and ethylene/vinyl acetate copolymers.

* * * * *